(12) United States Patent
Yokochi

(10) Patent No.: US 6,972,876 B2
(45) Date of Patent: Dec. 6, 2005

(54) IMAGE READING APPARATUS

(75) Inventor: Atsushi Yokochi, Chiryu (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 950 days.

(21) Appl. No.: 09/964,577

(22) Filed: Sep. 28, 2001

(65) Prior Publication Data

US 2002/0080420 A1    Jun. 27, 2002

(30) Foreign Application Priority Data

Dec. 7, 2000    (JP)    ............................. 2000-372298

(51) Int. Cl.[7] ........................... H04N 1/04; H04N 1/36; G05B 19/40; H02P 8/00
(52) U.S. Cl. ...................... 358/471; 358/406; 358/412; 358/474; 358/483; 358/486; 358/497; 358/409; 358/504; 358/505; 358/442; 358/404; 318/685; 318/696
(58) Field of Search ............................... 358/471, 474, 358/442, 404, 497, 494, 445, 412, 406, 504, 358/483, 482, 512–514, 409, 486, 496, 400, 358/500; 318/696, 685; 382/312, 318, 319; 250/208.1, 234–236

(56) References Cited

U.S. PATENT DOCUMENTS 5,177,626 A * 1/1993 Nosaki et al. ............... 358/486

6,115,149 A * 9/2000 Lai et al. ..................... 358/505
6,335,807 B1 * 1/2002 Neale et al. ................. 358/486
6,459,507 B1 * 10/2002 Wang et al. ................. 358/474

FOREIGN PATENT DOCUMENTS

JP       7-79405        8/1995
JP    2001127965 A *    5/2001    ............ H04N 1/04

* cited by examiner

*Primary Examiner*—Cheukfan Lee
(74) *Attorney, Agent, or Firm*—Oliff & Berridge, PLC

(57) ABSTRACT

The invention provides an image reading apparatus that produces a precise image of an original document to prevent the read image from having distortion or irregular density, by driving a DC motor, which drives an image reading unit in a scanning direction, at a constant speed suitable for a document to be read. In addition, the image reading apparatus prevents position errors or misalignment at the start of the image reading, or at a restart of the image reading after the image reading is paused. A speed control circuit provides feedback to a DC motor to synchronize a time interval detected by a pulse interval detecting circuit with a time interval set by an interval setting register, so that the DC motor is operated at a constant speed. A counter counts the number of signals output from an encoder. After the speed of the DC motor is stabilized, a timing of signals output from a CCD drive unit to the image reading unit is synchronized with a timing of the signals generated by the encoder. As a count in the counter reaches a predetermined number, an actual image reading is started. Thus, the position errors or misalignment are prevented in the produced image.

22 Claims, 8 Drawing Sheets

IMAGE READING APPARATUS

BACKGROUND OF THE INVENTION

1. Field of the Invention

The invention relates to an image reading apparatus, and more particularly, to a scanning control for an image reading unit of the image reading apparatus.

2. Description of the Related Art

A known image reading apparatus reads an image on a document in the following manner. The document placed on a document plate is illuminated with light. An image reading unit includes light-sensitive elements that convert light into electrical charge. The light-sensitive elements are aligned in a main scanning direction. Using a driving device, the image reading unit is moved across the document at a constant speed in a sub scanning direction. The light-sensitive elements of the image reading unit receive the light reflected from the document when the image reading unit is moved by one line. The reflected light received by the light-sensitive elements is converted into electrical charge and output as image data of each line. This conversion continues until the image data of one page of the document is read.

If the image reading apparatus is not moved in the sub scanning direction at a constant speed due to the mechanical variations or errors in the driving system, the time during which the light-sensitive elements receive the light reflected from the document may vary for each line. Such variations in the light-receiving time may cause non-uniform electrical charge accumulation in the light-sensitive elements, resulting in irregularity in the electrical charge density.

Accordingly, a known image reading apparatus makes some corrections to read image data. In order to make some corrections to the read image data, a light-receiving time of each line is compared with a reference time per line. Based on the comparison results, the read image data are expanded or reduced. However, it is difficult for the image reading apparatus to produce the read image as same as the original image of the document.

At a time when the image reading unit reaches an image reading start position, the electrical charge accumulated before may still remain in the light-sensitive elements of the image reading apparatus. In this case, the image data accumulated before the image reading apparatus starts reading are to be read as well. Therefore, resulting image data becomes improper.

While the image data for one page of the document are being read, the image data are stored in an image memory and then transferred from the image memory to an external device, such as a facsimile machine or a personal computer (PC). However, the transfer speed of the image data from the image memory to the external device is slower than the speed of the image reading apparatus reading an image. In such a case, no memory area may be available temporarily in the image reading apparatus when the image data stored in the memory exceeds a storage capacity thereof. Therefore, the image reading operations need to be paused before the stored image data exceeds the storage capacity of the memory, that is, the image reading operation always stop before completing the image reading operations for one page of the document. While the image reading operations are paused, the image data stored in the memory continues to be output to the external device to make the memory available. Then, the image reading operations need to be started again. However, there may be a distance from a position where an instruction to stop the drive system is located to a position where the drive system is actually stopped, or the period from the time when such an instruction is provided to the time the drive system is actually stopped may vary due to the mechanical variations or errors in the driving system. Therefore, the image reading operations may not be resumed precisely from the stopped position. Such position errors or misalignment may appear as a gap or an overlap in the read image.

In an image reading apparatus that reads an image from a document in color, the image reading unit of the apparatus reads the image of colors separately using, for example, red, blue, and green filters. The image read by the image reading apparatus may be produced in color different from the original document, if the image reading operations are not resumed precisely from the stopped position or the three filtered images are out of alignment.

SUMMARY OF THE INVENTION

It is an object of the invention to provide an image reading apparatus that produces a read image more precisely than the known image reading apparatus described above.

Considering the foregoing, one aspect of the present invention includes an image reading apparatus having an image reading device that reads an image from an original document as image data, a driving device that drives the image reading device in a sub scanning direction, a signal generator that generates a signal every time the driving device is driven by a specified amount of distance, a signal interval detecting device that detects the signals generated by the signal generator and a time interval between the signals, a setting device that generates a predetermined time interval at which the electrical charge is accumulated for one line by the image reading device, and a controller that controls the current supplied to the driving device to make the predetermined time interval detected by the signal interval detecting device corresponding to the predetermined time interval.

In the image reading apparatus of the present invention, the speed of the image reading device moving in the scanning direction may be controlled at all times during image reading operations, so as to meet the predetermined time interval indicated by the setting device. With this speed control, the image reading unit reads the image data at an interval based on the predetermined time interval. The movement of the image reading device in the sub scanning direction is controlled in accordance with the predetermined time interval. Therefore, the light-receiving time for each line is kept constant and position errors or misalignment in a read image are prevented.

According to another aspect of the present invention, an image reading apparatus includes an image reading device that reads an image on an original document as image data, a driving device that drives the image reading device in a scanning direction, a first signal generator that generates a first signal every time the driving device is driven by a specified amount of distance, a signal interval detecting device that detects first signals generated by the first signal generator and the time interval between first signals, a second signal device that generates a second signal indicating a predetermined time interval for reading an image by the image reading device at an interval, a controller that controls the current supplied to the driving device to make the time interval detected by the signal interval detecting device corresponding to the predetermined time interval, and a selecting device that selects an image reading mode for changing the predetermined time interval indicated in the second signal generated by the setting device. The predetermined time interval indicated in the second signal is changed by a resolution of the image reading device selected by the selecting device.

In the image reading apparatus of the present invention, the predetermined time interval indicated in the second signal generated by the second signal generator may be changed according to the image reading mode selected by the selecting device. Accordingly, a period of an electrical charge accumulating time may freely be changed. The image reading device may be driven at a speed appropriate for the document to be read. When the image is read in high resolutions, the image reading device may be driven at a constant speed slower than a reference speed. At this time, a movement interval of the image reading device may also be changed according to the changes in the predetermined time interval. Therefore, complicated controls for the image reading device are not necessary.

According to a third aspect of the invention, an image reading apparatus includes an image reading device that reads an image on an original document as image data, a driving device that drives the image reading device in a scanning direction, a first signal generator that generates a first signal every time the driving device is driven by a specified amount, a second signal generator that generates a second signal for reading the image by the image reading device at a fixed time interval, a signal interval detecting device that detects first signals generated by the first signal generator and the time interval between the first signals, and a controller that performs drive control for the image reading device by increasing or decreasing the current supplied to the driving device based on a difference between the time interval detected by the signal interval detecting device and the time between second signals generated by the second signal generator at the fixed time interval. After the difference diminishes, the controller synchronizes a timing to generate the second signal by the second signal generator with the timing to generate the first signal by the first signal generator and then starts to read the image by the image reading device.

In the image reading apparatus of the invention, based on the difference between the time interval detected by the signal interval detecting device and the time between the second signals generated by the second signal generator device, the value of current supplied to the driving device may be increased or decreased during image reading operations, so as to conduct drive controls for the image reading device. By synchronizing the moving speed of the driving device with an interval or a period of image reading, the light-receiving time for each line may be kept constant. To start reading the image on the document by the image reading device, the timing to generate the second signal by the second signal generator is synchronized with the timing to generate the first signal by the first signal generator. The electrical charge accumulation start position is, therefore, matched with the image reading start position. Thus, all the distortion, position errors, or misalignment problems in the image data are prevented.

According to a fourth aspect of the invention, an image reading apparatus includes an interface that connects the image reading apparatus and an external device, a storage device that temporarily stores the image data read by the image reading device before the image data are sent out to the external device through the interface, a detector that detects the amount of available storage space in the storage device, an instruction device that provides an instruction to stop driving the image reading device for the driving device can prevent the image data from being transmitted from the image reading device to the storage device when the detector detects that the image data equal to or greater than a predetermined amount are stored in the storage device. The image reading apparatus also includes a position storage device that stores a position of the image reading device in the scanning direction at a time when the instruction device provides the instruction. After receiving an instruction from the instruction device, the image reading device re-starts to read the image from the position stored in the position storage device when the detector detects that the image data stored in the storage device become equal to or less than a predetermined amount.

In the image reading apparatus of the present invention, the image data are transmitted to the external device through the interface. When the image data equal to or greater than the predetermined amount are stored in the storage device, which temporarily stores the image data read by the image reading device, the image reading operations are temporarily stopped. An instruction is provided to stop driving the image reading device for the driving device to prevent the image reading apparatus from transmitting the image data to the storage device. The position storage device stores the image reading stop position of the image reading device in the scanning direction. When the image data stored in the storage device become equal to or less than a predetermined amount, the image reading device will re-start to read the image from the position stored in the position storage device.

Even when the image reading operations are temporarily stopped to prevent the image data from overflowing from the storage device of the image reading apparatus, the position where the instruction to stop image reading operations is provided, is stored in the position storage device. After the image data stored in the storage device are output to the external device, the electrical charge starts to accumulate from the image reading stop position stored in the position storage device. Therefore, the position errors or misalignment caused by resuming the image reading operations are prevented.

BRIEF DESCRIPTION OF TIE DRAWINGS

The particular features and advantages of the invention as well as other objects will become more apparent from the following description taken in conjunction with the accompanying drawings, in which.

DETAILED DESCRIPTION OF THE EMBODIMENT

An embodiment of the invention will be described in detail with reference to the drawings.

Figure 1:
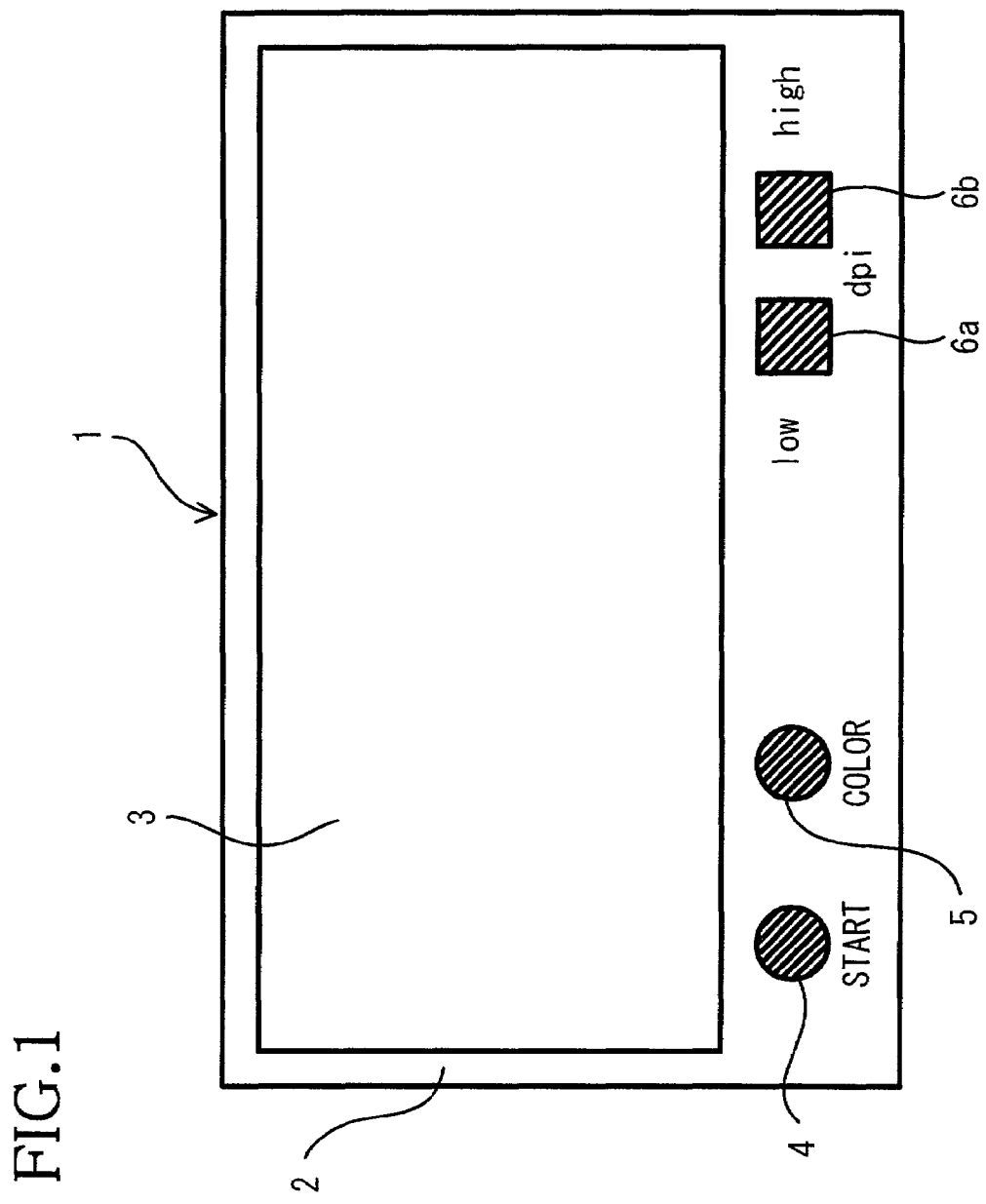
FIG. 1 is a schematic illustration of the image reading apparatus according to an embodiment of the present invention.

FIG. 1 is a schematic illustration of an image reading apparatus 1 according to an embodiment of the present invention. In the embodiment, the image reading apparatus 1 is a flatbed-type image reading apparatus.

As shown in FIG. 1, the image reading apparatus 1 is provided with a scanner plate 2, a cover 3, and buttons, such as a start button 4 to start reading an image on a document, a color image reading button 5 for switching image reading modes between a color mode and a monochrome mode, a low resolution setting button 6a and a high resolution setting button 6b for changing reading resolutions. The buttons 4, 5, 6a, 6b are provided in a top front surface of the image reading apparatus 1. Each of the buttons 5, 6a, 6b is switched on or off every time the respective button 5, 6a, or 6b is pressed.

To switch off the low resolution setting button 6a which has been switched on, either the button 6a or the high resolution setting button 6b is pressed, so that both of the low resolution setting button 6a and the high resolution setting button 6b are switched off. Similarly, to switch off the high resolution setting button 6b which has been switched on, either the button 6b or the low resolution setting button 6a is pressed, so that both the high resolution setting button 6b and the low resolution setting button 6a are switched off. A document is placed on the scanner plate 2, so as to face a side of the document having a text or graphics to be read downwardly. An upper surface of the scanner plate 2 on which the document is placed, is formed of a transparent material.

Figure 2:
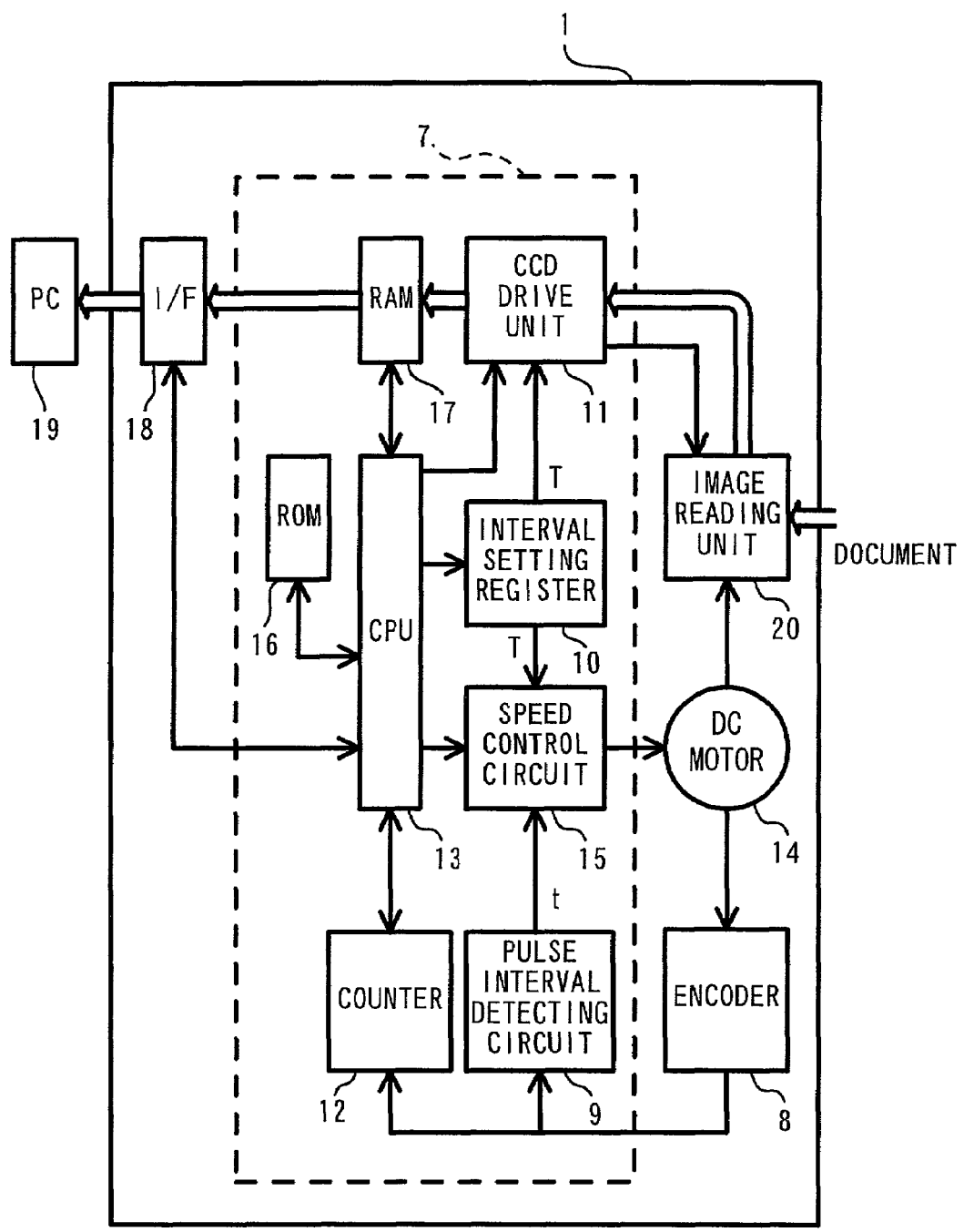
FIG. 2 is a block diagram of an electronics control circuit for controlling an image reading operation of the image reading apparatus.

FIG. 2 is a block diagram illustrating the electric circuits of the image reading apparatus 1 shown in FIG. 1. As shown in FIG. 2, the image reading apparatus 1 includes an image reading unit 20, a DC motor 14, an encoder 8, an interface 18, and an electronics control circuit 7. The image reading unit 20 includes a light source that illuminates the document and a charge-coupled device (CCD) line sensor including light-sensitive elements that convert light from the light source reflected off the document into electrical charge. The light-sensitive elements are aligned in a main scanning direction. The DC motor 14 moves the image reading unit 20 in a sub scanning direction. The encoder 8 is mounted to a drive shaft of the DC motor 14 and generates a pulse signal every time the DC motor is driven by a fixed amount. The interface 18 sends out image data, for example, to a personal computer (PC) 19. The electronics control circuit 7 controls image reading operations. The image reading unit 20 represents an image reading device. The DC motor 14 represents a driving device that drives the image reading device in a scanning direction. The encoder 8 represents a first signal generator.

The electronics control circuit 7 includes the following components: a pulse interval detecting circuit 9 detects a time interval "t" of a pulse signal generated by the encoder 8; a central processing unit (CPU) 13 performs various controls, which will be described below in more details; an interval setting register 10 sets, under an instruction of the CPU 13, a time interval "T" at which the electrical charge is accumulated for one line; a CCD drive unit 11 generates a pulse signal at the time interval "T" set by the interval setting register 10; a counter 12 counts the number of the pulse signals generated by the encoder 8; a speed control circuit 15 controls the DC motor 14 in accordance with outputs of the pulse interval detecting circuit 9 and the interval setting register 10, as well as the instruction of the CPU 13; a read-only memory (ROM) 16 stores various programs and initial setting values; and a random-access memory (RAM) 17 stores the image data read by the image reading unit 20.

The CPU 13 instructs the speed control circuit 15 to rotate the DC motor 14 in a forward direction or a reverse direction, or to stop the DC motor 14 from rotating. The CPU 13 also instructs the counter 12 to add or subtract the count in response to a pulse signal input to the counter 12. The CPU 13 monitors conditions of connection between the interface 18 and the PC 19, as well as available memory amounts in the RAM 17. The CPU 13 determines a selected image reading mode, based on whether the color image reading button 5, the low resolution setting button 6a, or the high resolution setting button 6b is pressed. The CPU 13 notifies the interval setting register 10 of the selected image reading mode.

The image reading operations of the image reading apparatus 1 structured as described above will be explained below, with reference to flow charts in FIGS. 3 and 4.

Before starting to read an image on a document, which is placed on the scanner plate 2, the interval setting register 10 sets the time interval "T" according to the selected image reading mode. Selection of the image reading modes will also be described in more detail below.

Figure 3:
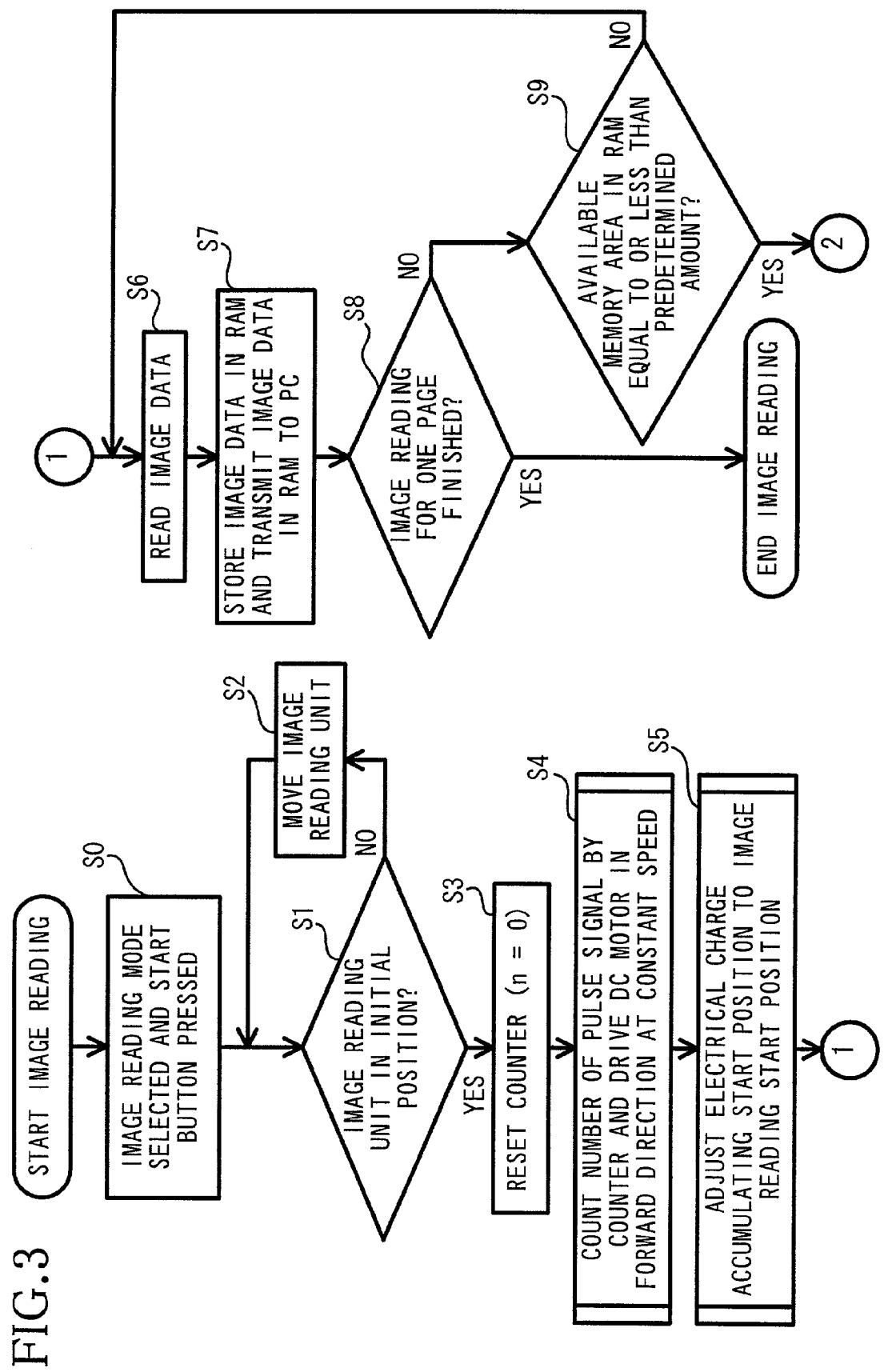
FIG. 3 is a flow chart illustrating an image reading operation of the image reading apparatus.
Figure 4:
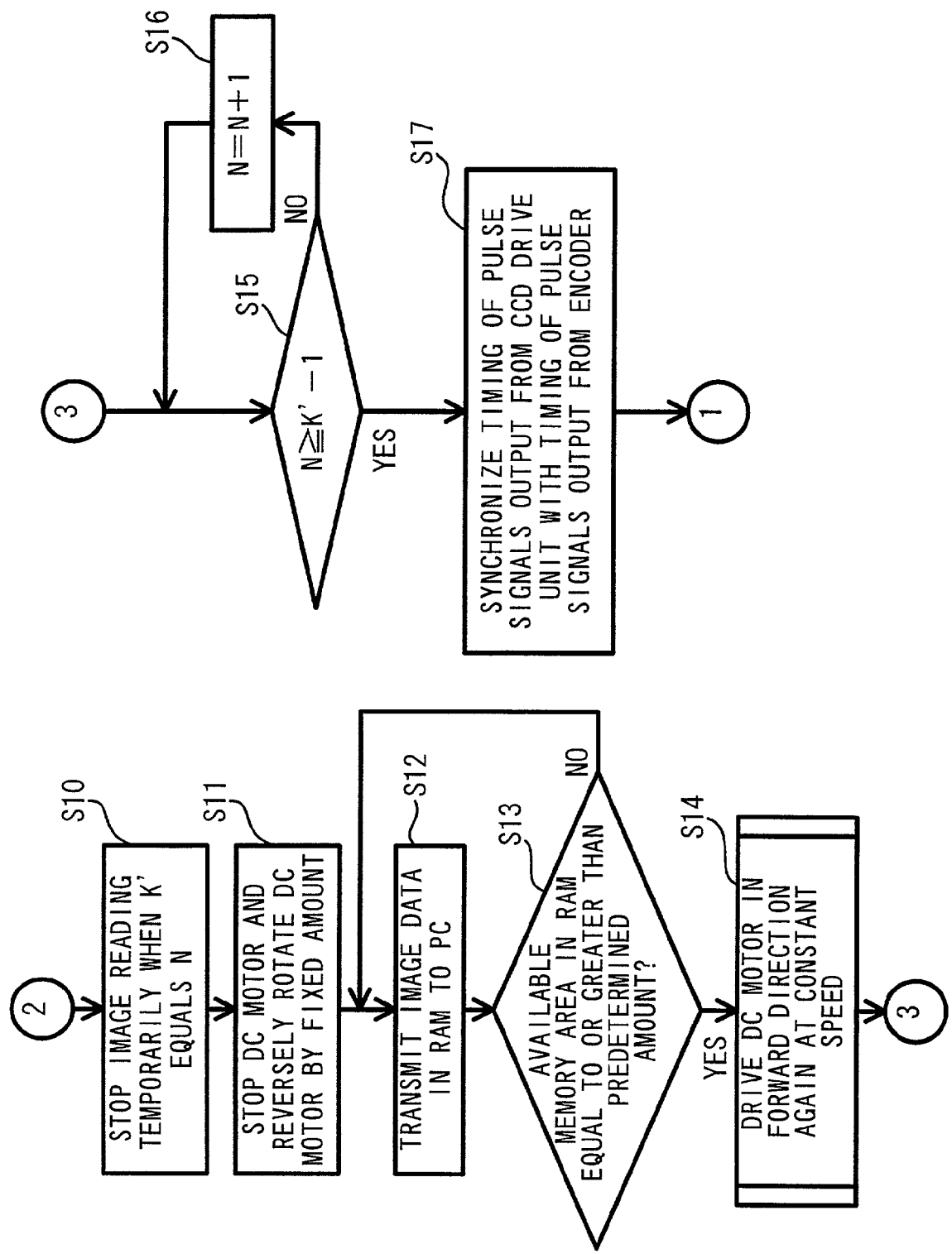
FIG. 4 is a flow chart illustrating an operation to be performed when a memory area in a random-access memory (RAM) becomes unavailable during the image reading operation in the image reading apparatus.

In FIG. 3, when the image reading mode is set and the start button 4 is pressed (S0), a detecting device detects whether the image reading unit 20 is in an initial position (S1). The detecting device can be any device that outputs a signal when the image reading unit 20 reaches the initial position. A simple switch device (not shown) or a photo-interrupter (not shown) may be used as the detecting device.

When the detecting device detects that the image reading unit 20 is not in the initial position (NO in S1), the CPU 13 instructs the speed control circuit 15 to rotate the DC motor 14 in the reverse direction, and to move the image reading unit 20 to the initial position (S2).

When the detecting device detects the image reading unit 20 is in the initial position (YES in S1), the CPU 13 instructs the CCD drive unit 11 to turn on the light source in the image reading unit 20. The CPU 13 also instructs the speed control circuit 15 to rotate the DC motor 14 in the forward direction. The count "n" in the counter 12 is reset to zero (S3). In response to a pulse signal input to the counter 12, the counter 12 starts counting the number "n" of the pulse signals from zero (S4) after receiving the instruction from the CPU 13. The number "n" counted by the counter 12 is an integer. When the DC motor 14 is rotated in the forward direction, the counter 12 adds the count in an increment of one. When the DC motor 14 is rotated in the reverse direction, the counter 12 subtracts the count in a decrement of one. The speed control circuit 15 synchronizes the time interval "t" detected by the pulse interval detecting circuit 9 with the time interval "T" set by the interval setting register 10. Feedback is provided to the DC motor 14, so that the DC motor 14 is controlled to operate at a constant speed.

Figure 5:
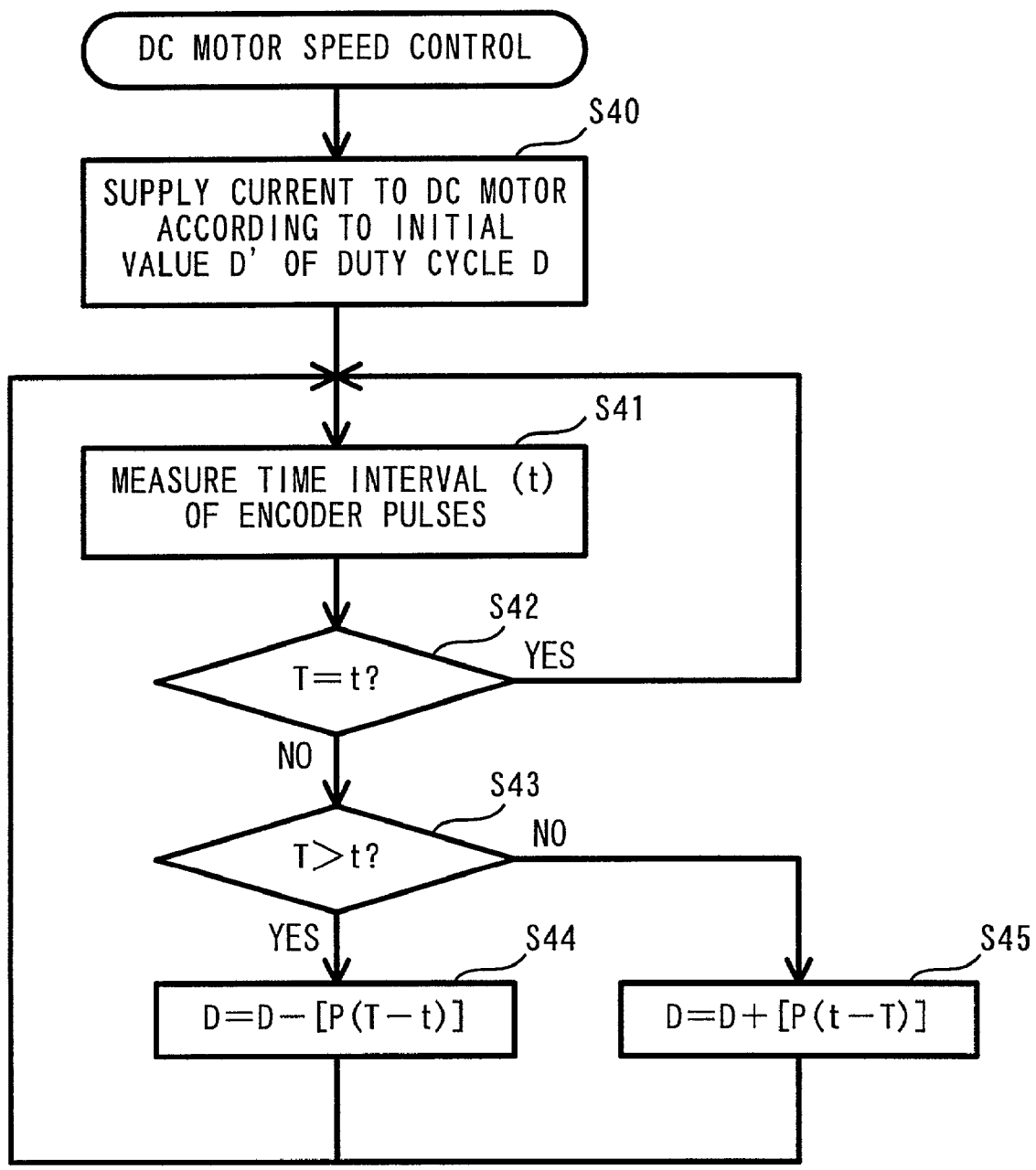
FIG. 5 is a flow chart illustrating a DC motor speed control by a speed control circuit.
Figure 8:
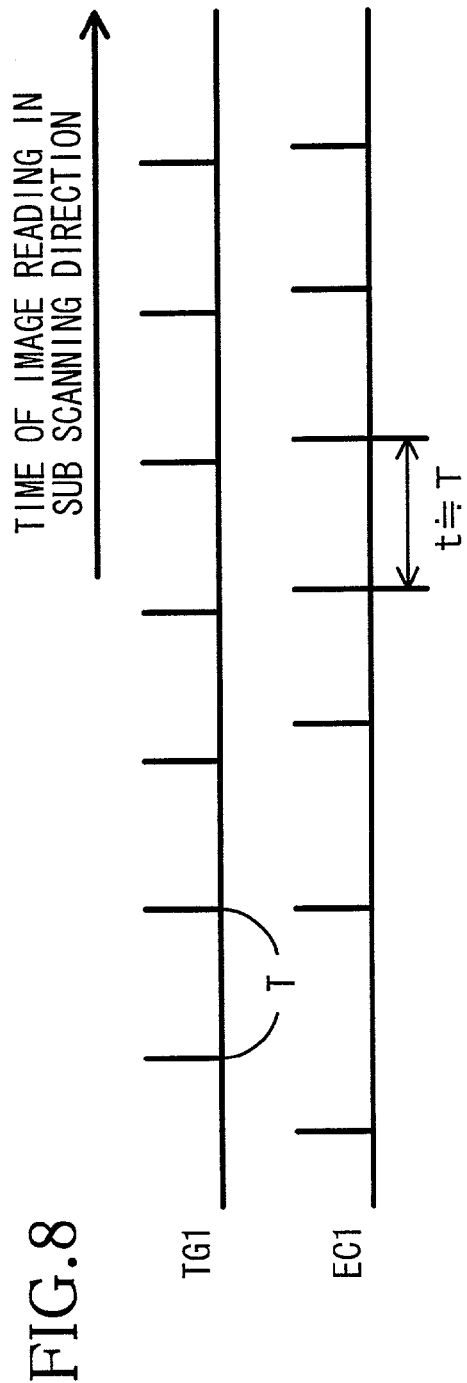
FIG. 8 is a diagram illustrating time-base relationship between outputs of the interval setting register and outputs of an encoder.

Speed controls for the DC motor 14 will be described in more detail, with reference to a flow chart in FIG. 5 and a diagram in FIG. 8 illustrating a time-base relationship between outputs TG1 of the interval setting register 10 and outputs EC1 of the encoder 8.

The time interval "T" set by the interval setting register 10 according to the image reading mode settings is output to the speed control circuit 15. A pulse signal is output, as the DC motor 14 is driven by a fixed amount, from the encoder 8 to the pulse interval detecting circuit 9. Every time a pulse signal is input to the pulse interval detecting circuit 9, the pulse interval detecting circuit 9 measures a time interval "t" between the pulse signal and its immediately preceding pulse signal. The measured time interval "t" is output to the speed control circuit 15 every time the time interval "T" is measured.

For the speed control of the DC motor 14, the speed control circuit 15 controls the DC motor 14 with a pulse width modulation (PWM). The current supplied to the DC motor 14 is controlled by changing a duty cycle D. After an image reading command is entered by pressing the start button 4, the current in accordance with an initial value D' of duty cycle "D" is supplied to the DC motor 14 (S40). Thereafter, the pulse interval detecting circuit 9 measures the time interval "t" (S41). The speed control circuit 15 compares the measured time interval "t" with the time interval "T". When the measured time interval "t" equals the time interval "T" (YES in S42), the duty cycle "D" is not changed. The pulse interval detecting circuit 9 conducts the next measurement of the pulse signals input from the encoder 8. When the measured time interval "t" does not equal the time interval "T" (NO in S42) and the time interval "t" is smaller than the time interval "T" (YES in S43), the duty cycle "D" is changed to a value resulted from subtracting a value "P(T-t)" from the duty cycle "D" (S44), to reduce the driving speed of the DC motor 14, where "P" is a preset parameter value. When the time interval "t" is greater than the time interval "T" (NO in S43), the duty cycle "D" is changed to a value resulted from adding a value "P(t-T)" to the duty cycle "D" (S45), to increase the driving speed of the DC motor 14.

After the duty cycle "D" is thus changed according to the measured time interval "t", the time interval "t" is measured again (S41). The duty cycle "D" is changed again and again, until the time interval "t" becomes equal to the time interval "T", as shown in FIG. 8, so as to make the DC motor 14 operated at a constant speed.

As described above, the time interval "T" detected by the pulse interval detecting circuit 9 is synchronized with the time interval "T" set by the interval setting register 10. Accordingly, a moving speed of the image reading unit 20 is controlled to a constant speed in synchronization with an image reading timing according to the selected image reading modes.

The pulse interval detecting circuit 9 (the signal interval detecting circuit) detects the time interval between two consecutive signals, which are generated as the DC motor 14 is driven by a fixed amount. Therefore, drive controls for the image reading unit 20 is precisely performed.

After the speed of the DC motor 14 has been stabilized, the CCD drive unit 11 adjusts an electrical charge accumulating start position to an image reading start position (S5), as shown in FIG. 3, by synchronizing the timing of pulse signals, which are output from the CCD drive unit 11 to the image reading unit 20, with the timing of pulse signals generated by the encoder 8.

Figure 6:
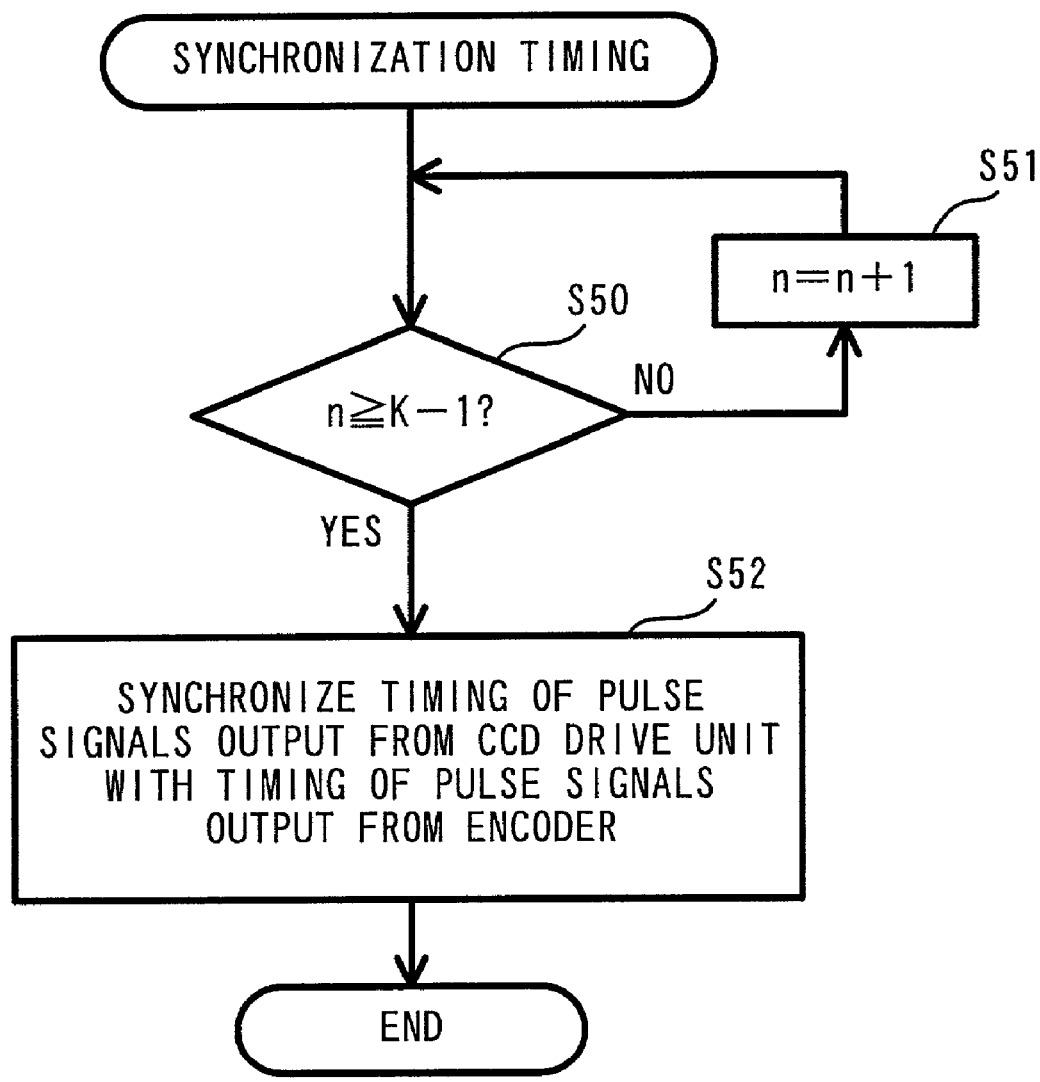
FIG. 6 is a flow chart illustrating a timing to synchronization of a signal output by a CCD drive circuit.
Figure 9:
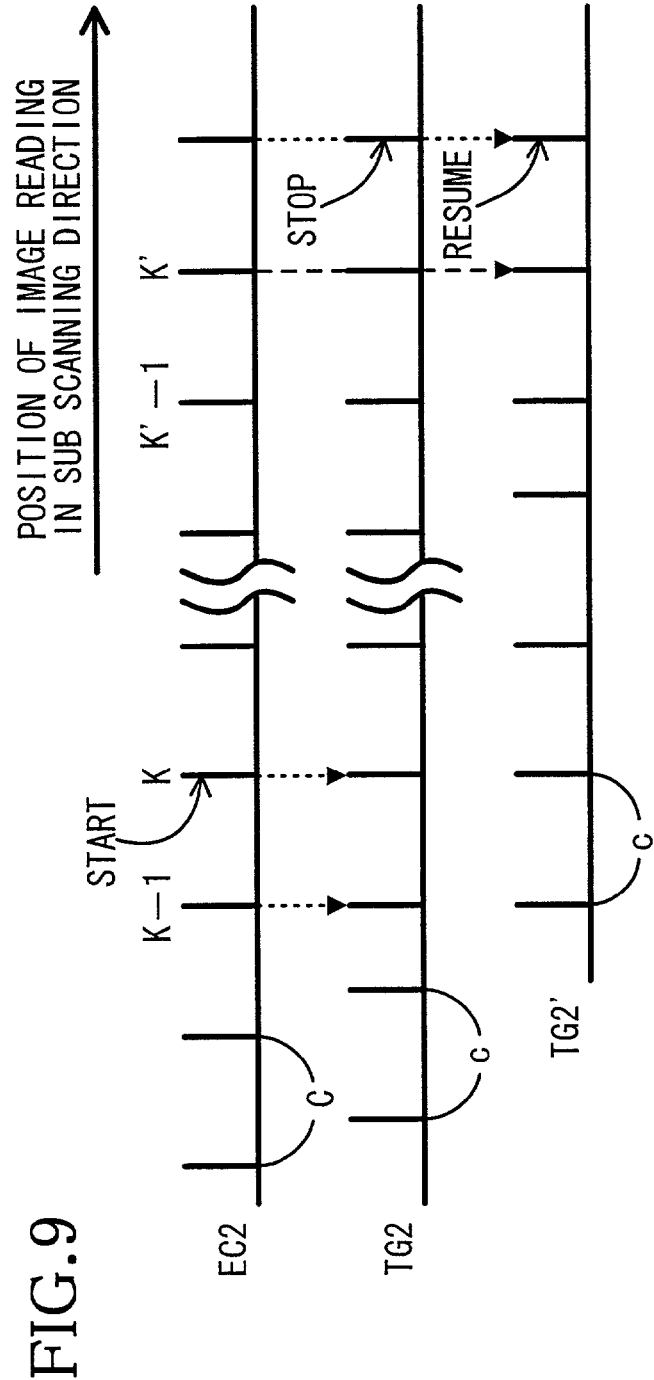
FIG. 9 is a diagram illustrating a positional relationship between outputs of the charge-coupled device (CCD) drive unit and outputs of the encoder.

Such synchronization of the pulse signals will be described in more detail below, with reference to the flow chart in FIG. 6 and the diagram in FIG. 9 illustrating a positional relationship between outputs TG2 of the CCD drive unit 11 and outputs EC2 of the encoder 8.

The encoder 8 outputs pulse signals at a fixed position interval "C". The CCD drive unit 11 outputs pulse signals at a fixed position interval "c" in accordance with a driving speed of the DC motor 14 and the time interval "T" set by the interval setting register 10. The image reading start position is represented by a count "K" in the counter 12. When the count "n" in the counter 12 has not yet reached "K-1" (NO in S50), the counter 12 adds the count by one (S51). When the count "n" in the counter 12 reaches "K-1" (YES in S50), the CPU 13 sends a reset signal to the CCD drive unit 11 in order to synchronize the timing of the pulse signals output from the CCD drive unit 11 with the timing of the pulse signals output from the encoder 8 (S52). As the count "n" in the counter 12 reaches "K", the image reading starts in the image reading unit 20 (S6), as shown in FIG. 3. More specifically, when the count "n" reaches "K", the electrical charge accumulated in the light-sensitive elements is cleared to newly accumulate the electrical charge in the light-sensitive elements.

The image reading operations are started after the timing of the pulse signals output from the CCD drive unit 11 is synchronized with the timing of the pulse signals generated by the encoder 8. The time interval between the signals, which is generated when the driving device is on, is synchronized with an image reading time for one line by the image reading unit 20. Further, the electrical charge accumulating start position is matched with an image reading start position. Therefore, a precise image of the original document is obtained without distortion, irregularity in density, and position errors in the read image.

The count "K" representing the image reading start position in the counter 12 can be varied by providing a setting device (not shown) for the counter 12. In addition, a multiplication signal generator (not shown) that generates a multiplication signal of an encoder signal is provided between the encoder 8 and the counter 12, so that the image reading start position can be designated more precisely.

The count "K" is set at such a number that a distance represented by the count "K" times the positional interval "C" well exceeds the distance from the initial position of the image reading unit 20 to a position where the image reading unit 20 driven by the DC motor 14 reaches a constant speed.

The image data, which are read by the image reading unit 20 at intervals of pulse signals output from the CCD drive unit 11, are temporarily stored in the RAM 17 and sequentially transmitted to the PC 19, through the interface 18 (S7). The CPU 13 finishes the image reading operations at the time when the image data of one page of the document are read by the image reading unit 20 and sent out to the PC 19 completely (YES in S8).

Then, it is determined whether the image reading for one page of the document is finished (S8). When the image reading for one page has not yet finished (NO in S8), the CPU determines whether a memory area equal to or less than a predetermined amount (S9) in the RAM 17 is available. A memory area in the RAM 17 can be fully occupied by the image data, if the image data of one page of the document are being read, and an image data transmission speed from the RAM 17 to the PC 19 does not catch up with an image reading speed at which the image reading unit 20 reads an image on the document.

When the RAM 17 stores the image data equal to or great than a predetermined amount and the available memory area in the RAM 17 becomes equal to or less than the predetermined amount in the middle of the image reading operations (YES in S9), the image reading operation is temporarily stopped. The CPU 13 continues to store the image data that have been read at the time when the RAM 17 stores the image data equal to or great than the predetermined amount until the encoder 8 outputs a subsequent signal. The CPU 13 stores in the RAM 17 a count "K" of the counter 12 as an image reading stopped position (S10), as shown in FIG. 4. Thereafter, the CPU 13 instructs the speed control circuit 15 to stop the DC motor 14 and to rotate the DC motor 14 reversely by a fixed amount (S1). The counter 12 counts the number of the pulse signals generated while the DC motor 14 is coasting after the instruction to stop the DC motor 14 provided by the CPU 13. When the CPU 13 provides the instruction to rotate the DC motor 14 in the reverse direction, the CPU 13 instructs the counter 12 to perform subtraction. The counter 12 subtracts the number of the counted pulse signals while the DC motor 14 is reversely rotated.

While the image reading operations are being paused, the image data in the RAM 17 are successively sent out to the PC 19 (S12). when the CPU 13 detects that the memory area available in the RAM 17 becomes equal to or greater than a predetermined amount (YES in S13), the CPU 13 instructs the speed control circuit 15 to rotate the DC motor 14 in the forward direction. While the counter 12 counts the encoder signals, feedback is provided to the DC motor 14, similar to the feedback provided at the start of the image reading operations, so that the DC motor 14 becomes operating at a constant speed to resume the image reading operations (S14). For the feedback control, the generally used proportion-integral-derivative (PID) control or proportion-derivative (PD) control may be employed.

Operations to resume the image reading operations after the stabilization of the DC motor speed will be described with reference to FIG. 9 illustrating the positional relationship between outputs EC2 of the encoder 8 and outputs TG2' of the CCD drive unit 11.

As the count "n" in the counter 12 reaches "K'-1", just one count before the count "K'" which represents an image reading stopped position and is stored in the RAM 17 (YES in S15), the CPU 13 transmits the reset signal to the CCD drive unit 11 to synchronize the timing of the pulse signals output from the CCD drive unit 11 with the timing of the pulse signals output from the encoder 8 (S17). Thereafter, when the count "n" in the counter 12 reaches "K'" in response to an incoming encoder signal, the image reading operations are resumed. When the count "n" in the counter 12 has not yet reached "K'-1" (NO in S15), the counter 12 adds the count by one in response to an input pulse signal (S16).

The above-described operations are repeatedly performed until the image data for one page of the document is completely read.

Even when the image reading operations are paused due to the insufficient memory available in the RAM 17, the image reading operations can resumed at a precise position where the image reading operations had been previously stopped, because the image reading stop position is stored in the RAM 17 by the counts of counter 12. Therefore, when the DC motor 14 is rotated in the reverse direction and then in the forward direction, the image reading operations begin at the position where the count "n" in the counter 12 reaches or matches the count "K'" that indicates the image reading stop position.

In this embodiment, the image reading stopped position is matched with an image reading restart position, and electrical charge accumulation is resumed at the image reading restart position. Therefore, when the image reading operations are stopped and then started again, position errors or misalignment in the read image are prevented.

In the above-described embodiment, the image data in the RAM 17 is sequentially transmitted to the PC 19, while the image reading operations are being paused, to ensure the available memory equal to or greater than the predetermined amount in the RAM 17. However, the image data equal to or greater than the predetermined amount may be transmitted at one time to an external device, such as a PC or a facsimile machine, at any time until the image reading operations are resumed after the driving device, for example, the DC motor 14 has been stopped.

The amount by which the DC motor 14 is reversely rotated is a sufficient amount for the counter 12 not to exceed the count "K'" while the DC motor 14 is being driven again in the forward direction from a position where the reversely-rotated-DC motor 14 has been stopped. The DC motor 14 is, therefore, operated at a constant speed.

The image mode selection will now be described.

To select image reading modes, the color image reading button 5, the low resolution setting button 6a, and/or the high resolution setting button 6b are pressed. Accordingly, the time interval "T" is set by the interval setting register 10. In this embodiment, when the color image reading button 5 is pressed, an image of a document is read in color. When the button 5 is pressed, the image of a document is read in monochrome. When the low resolution setting button 6a is pressed, the resolution is 75 dpi. When the high resolution setting button 6b is pressed, the resolution is 600 dpi. When neither the button 6a nor the button 6b is pressed, the resolution 300 dpi.

Figure 7:
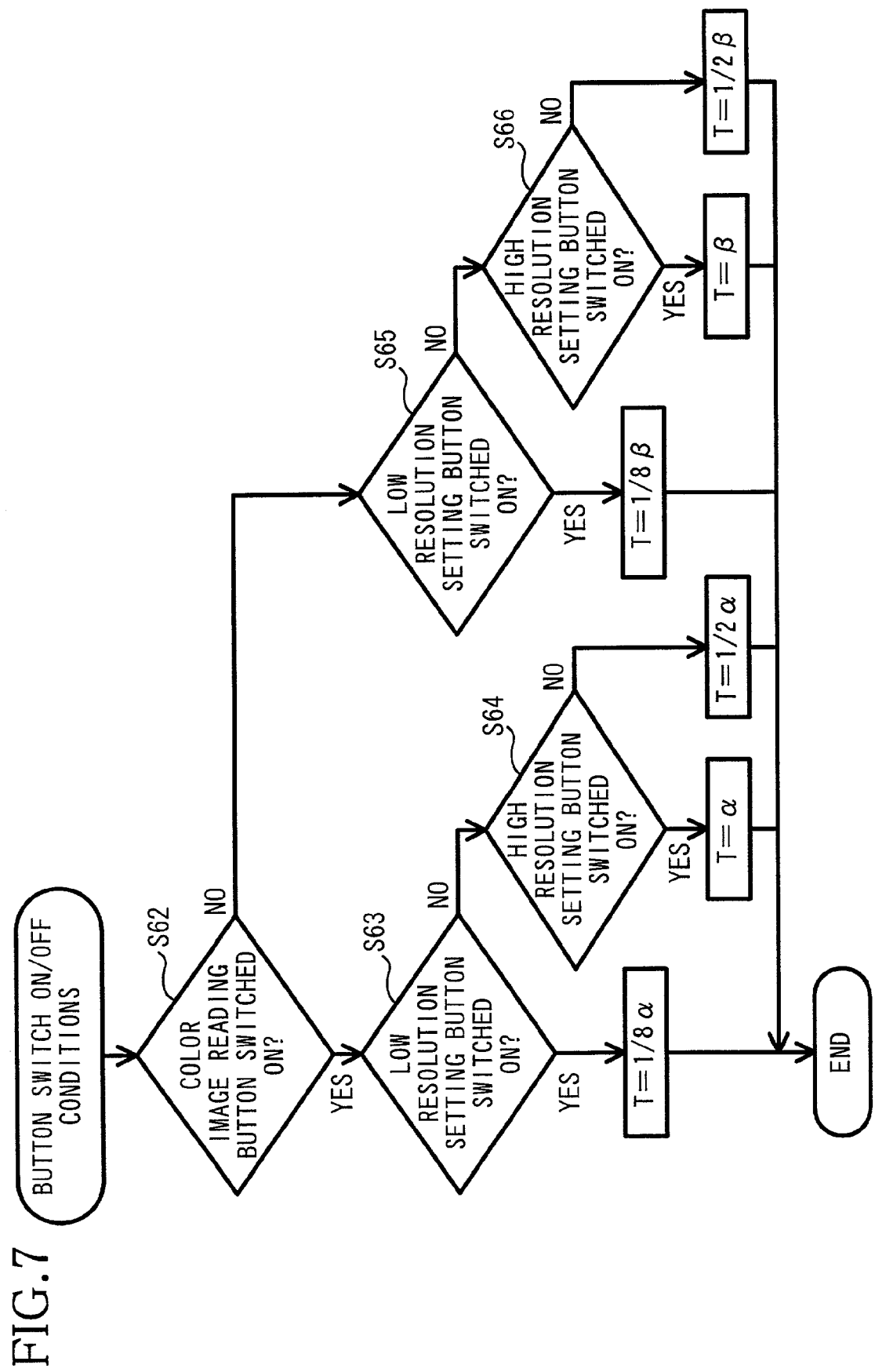
FIG. 7 is a flow chart illustrating a time interval setting by an interval setting register according to on/off conditions of buttons.

As shown in FIG. 7, it is first determined to press the color image reading button 5 (S62). When the button 5 is on (YES in S62) and the low resolution setting button 6a is pressed to designate the resolution of 75 dpi (YES in S63), the time interval "T" is set to $\frac{1}{8}\alpha$, where $\alpha$ is a prescribed value. When the low resolution setting button 6a is not on (NO in S63), it is determined to press the high resolution setting button 6b (S64). When the button 6b is on (YES in S64), the time interval "T" is set to "$\alpha$". When the button 6b is not on(NO in S64), the time interval "T" is set to $\frac{1}{2}\alpha$. When the color image reading button 5 is not on, that is, the monochrome image reading is selected (NO in S62), it is determined that the low resolution setting button 6a is pressed to designate the resolution of 75 dpi (S65). When the button 6a is on (YES in S65), the time interval "T" is set to $\frac{1}{8}\beta$ where $\beta$ is a prescribed value. When the low resolution setting button 6a is not switched on (NO in S65), it is determined that the high resolution setting button 6b is pressed to designate the resolution of 600 dpi (S66). When the button 6b is on (YES in S66), the time interval "T" is set to "$\beta$". When the button 6b is not switched on (NO in S66), the time interval "T" is set to $\frac{1}{2}\beta$. The prescribed value "$\alpha$" is greater than the prescribed value "$\beta$".

In the above-described embodiment, the set image reading modes are identified according to whether the buttons 5, 6a, or 6b is switched on. However, the set image reading modes may be identified by providing, next to the buttons 5, 6a, and 6b, a liquid crystal display (LCD) that indicates the set image reading modes, or by providing light emitting diodes (LEDs) that turn on or off to indicate the set image reading modes. Further, the image reading modes, such as color image reading and image reading at high resolutions, may be set by an external device, for example, a PC or a facsimile machine, without providing various keys or buttons for setting the image reading modes on the image reading apparatus.

In the embodiment, the resolution values are not limited to 75 dpi, 300 dpi, or 600 dpi, but any values if a plurality of kinds of resolution values are provided. The resolutions can be set simply by directly inputting desirable resolution values.

In the above-described image reading apparatus of the present invention, the driving speed of the image reading device may be set to an appropriate speed according to the selected image reading modes without providing tables or memories to store the position and speed references to control the image reading device.

While the invention has been described with reference to the embodiment, it is to be understood that the present invention is not restricted to the particular forms shown in the foregoing embodiment. Various modifications and alterations can be made thereto without departing from the scope of the invention, as set forth in the appended claims.

What is claimed is:

1. An image reading apparatus for use with an original document, comprising:
   an image reading device that reads an image on the original document as image data;
   a driving device that drives the image reading device in a sub scanning direction;
   a signal generator that generates a signal every time the image reading device is driven by the driving device by a specified amount;
   a signal interval detecting device that detects the signals generated by the signal generator and a time interval between the signals;
   a setting device that generates a predetermined time interval at which the electrical charge is accumulated for one line by the image reading device; and
   a controller that controls a value of current supplied to the driving device to make the time interval detected by the signal interval detecting device corresponding to the predetermined time interval.

2. The image reading apparatus according to claim 1, further comprising a selecting device that selects an image reading mode; and
   wherein the predetermined time interval generated by the setting device is changed according to the image reading mode selected by the selecting device.

3. The image reading apparatus according to claim 2, wherein the selecting device selects an image reading resolution of the image reading device.

4. The image reading apparatus according to claim 3, wherein the selecting device selects the image reading mode to read the image in color or in monochrome.

5. The image reading apparatus according to claim 1, wherein the signal interval detecting device detects the time interval between one of the signals and a preceding one of the signals every time the signal interval detecting device detects the one of the signals generated by the signal generator.

6. The image reading apparatus according to claim 1, wherein after the time interval becomes equal to the predetermined time interval, the controller synchronizes a timing to generate the predetermined time interval by the setting device with a timing to generate the signal by the signal generator and then starts to read the image by the image reading device.

7. The image reading apparatus according to claim 1, further comprising:
   an interface that connects the image reading apparatus and an external device;
   a storage device that temporarily stores the image data read by the image reading device before the image data are sent out to the external device through the interface;
   a detector that detects an amount of the image data storable in the storage device;
   an instruction device that provides an instruction to stop driving the image reading device for the driving device to prevent the image data from being transmitted from the image reading device to the storage device when the detector detects that the image data equal to or greater than a predetermined amount is stored in the storage device; and
   a position storage device that stores a position of the image reading device in the sub scanning direction at a time when the instruction device provides the instruction; and
   wherein after the instruction device provides the instruction, the image reading device re-starts to read the image from the position stored in the position storage device when the detector detects that the image data stored in the storage device become equal to or less than a predetermined amount.

8. The image reading apparatus according to claim 1, wherein the predetermined time interval is set so as to correspond the detected time interval with a multiplication of the predetermined time interval.

9. An image reading apparatus for use with an original document, comprising:
   an image reading device that reads an image on the original document as image data;
   a driving device that drives the image reading device in a sub scanning direction;
   a signal generator that generates a signal every time the image reading device is driven by the driving device by a specified amount;
   a signal interval detecting device that detects the signals generated by the signal generator and a time interval between the signals;
   a setting device that generates a predetermined time interval at which the electrical charge is accumulated for one line by the image reading device;
   a controller that controls a value of current supplied to the driving device to make the time interval detected by the signal interval detecting device corresponding to the predetermined time interval;
   a selecting device that selects an image reading solution to the image reading device;
   wherein the predetermine time interval generated by the setting device is changed according to the selecting device.

10. An image reading apparatus for use with an original document, comprising:
    an image reading device that reads an image on the original document as image data;
    a driving device that drives the image reading device in a sub scanning direction;
    a first signal generator that generates a first signal every time the driving device is driven by a specified amount;
    a second signal generator that generates a second signal for reading the image by the image reading device at a predetermined time interval;
    a signal interval detecting device that detects first signals generated by the first signal generator and a time interval between the first signals; and
    a controller that performs drive control for the image reading device by increasing or decreasing a value of current supplied to the driving device based on a difference between the time interval detected by the signal interval detecting device and the predetermined time interval generated by the second signal generator; and wherein after the difference becomes none, the controller synchronizes a timing to generate the second signal by the second signal generator with a timing to generate the first signal by the first signal generator and then starts to read the image by the image reading device.

11. The image reading apparatus according to claim 10, further comprising a selecting device that selects an image reading mode; and wherein the predetermined time interval generated by the second signal generator is changed according to the image reading mode selected by the selecting device.

12. The image reading apparatus according to claim 11, wherein the selecting device selects an image reading resolution of the image reading device.

13. The image reading apparatus according to claim 12, wherein the selecting device selects the image reading mode to read the image in color or in monochrome.

14. The image reading apparatus according to claim 10, wherein the signal interval detecting device detects the time interval between one of the first signals and a preceding one of the first signals every time the signal interval detecting device detects the one of the first signals generated by the first signal generator.

15. The image reading apparatus according to claim 10, further comprising:
an interface that connects the image reading apparatus and an external device;
a storage device that temporarily stores the image data read by the image reading device before the image data are sent out to the external device through the interface;
a detector that detects an amount of the image data storable in the storage device;
an instruction device that provides an instruction to stop driving the image reading device for the driving device to prevent the image data from being transmitted from the image reading device to the storage device when the detector detects that the image data equal to or greater than a predetermined amount are stored in the storage device; and
a position storage device that stores a position on the document or a position of the image reading device in the sub scanning direction at a time when the instruction device provides the instruction; and
wherein after the instruction device provides the instruction, the image reading device re-starts to read the image from the position stored in the position storage device as the detector detects that the image data stored in the storage device become equal to or less than a predetermined amount.

16. The image reading apparatus according to claim 10, wherein the predetermine time interval is set so as to correspond to the detected time interval with a multiplication of the predetermine time interval.

17. An image reading apparatus for use with an original document, comprising:
an image reading device that reads an image on the original document as image data;
a driving device that drives the image reading device in a sub scanning direction;
a first signal generator that generates a first signal every time the driving device is driven by a specified amount;
a signal interval detecting device that detects first signals generated by the first signal generator and a time interval between the first signals;
a second signal generator that generates a second signal indicating a predetermined time interval for reading the image by the image reading device;
a controller that controls a value of current supplied to the driving device to make the time interval detected by the signal interval detecting device correspond with the predetermined time interval; and
a selecting device that selects an image reading mode for changing the predetermined time interval indicated in the second signal generated by the second signal generator; and
wherein the predetermined time interval indicated in the second signal is changed by a resolution of the image reading device selected by the selecting device.

18. The image reading apparatus according to claim 17, wherein the selecting device selects the image reading mode to read the image in color or in monochrome.

19. The image reading apparatus according to claim 17, wherein the signal interval detecting device detects the time interval between one of the first signals and a preceding one of the first signals every time the signal interval detecting device detects the first signal generated by the first signal generator.

20. The image reading apparatus according to claim 17, wherein after the time interval becomes equal to the predetermined time interval, the controller synchronizes a timing to generate the second signal by the setting device with a timing to generate the first signal by the first signal generator and then starts to read the image by the image reading device.

21. The image reading apparatus according to claim 17, further comprising:
an interface that connects the image reading apparatus and an external device;
a storage device that temporarily stores the image data read by the image reading device before the image data is sent out to the external device through the interface;
a detector that detects an amount of the image data storable in the storage device;
an instruction device that provides an instruction to stop driving the image reading device for the driving device to prevent the image data from being transmitted from the image reading device to the storage device when the detector detects that the image data equal to or greater than a predetermined amount are stored in the storage device; and
a position storage device that stores a position of the image reading device in the sub scanning direction at a time when the instruction device provides the instruction; and
wherein after the instruction device provides the instruction, the image reading device re-starts to read the image from the position stored in the position storage device as the detector detects that the image data stored in the storage device become equal to or less than a predetermined amount.

22. The image reading apparatus according to claim 17, wherein the predetermined time interval is set so as to correspond to the detected time interval with a multiplication of the predetermined time interval.

* * * * *